United States Patent Office 3,224,134
Patented Dec. 21, 1965

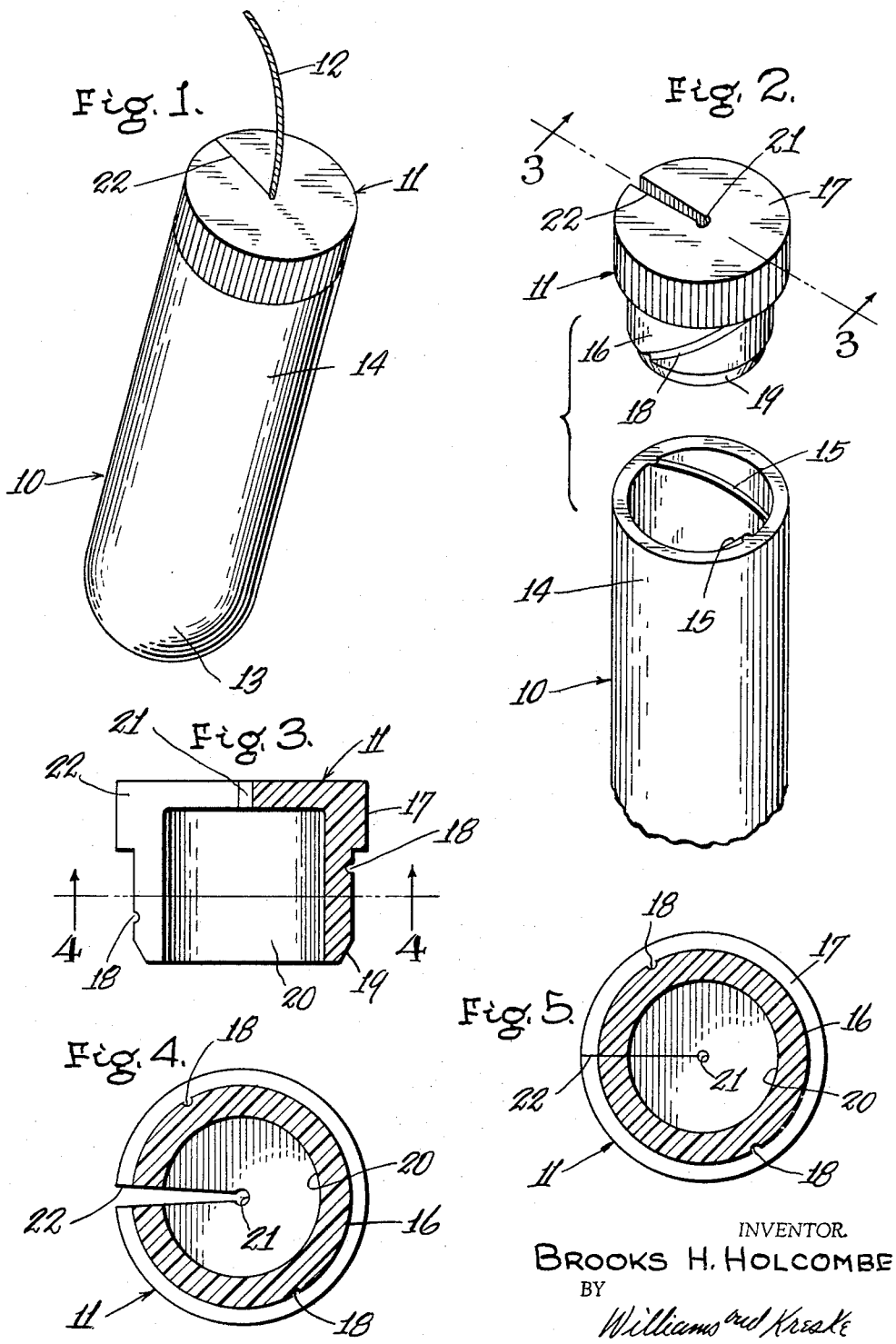

3,224,134
PROTECTOR FOR FISHING HOOK AND THE LIKE
Brooks H. Holcombe, R.D. 2, Kinsman, Ohio
Filed Dec. 28, 1964, Ser. No. 421,432
11 Claims. (Cl. 43—57.5)

This application is a continuation-in-part of application Serial No. 343,396, filed February 7, 1964, entitled Fishing Hook Guard, and now abandoned. The present invention relates to a device for protecting a fishing hook and the like, especially while it is attached to a line and the like, and the principal object of the invention is to provide new and improved devices of the character described.

The carrying of fishing hooks or fishing lures including fishing hooks, particularly when the hooks or lures are attached to a fishing line which is in turn attached to a fishing rod, not only presents a danger in that the fisherman may snag himself on the hook but also that the hook may become snagged on objects which, at best, will dull the point of the latter. To alleviate the foregoing danger and inconvenience, it has been proposed to store the hook or lure in a small container when it is not in use. While disposition of the hook in such a container is a basically sound expedient, prior art devices have not been entirely satisfactory because of complexity, high manufacturing costs, inconvenience in use and the like.

In contrast, the present invention provides a device which can be produced and sold at a nominal price, which is so simple in structure that there is little likelihood of its getting out of order, and which is convenient to use and very effective for the purpose designed. These and other advantages will readily become apparent from a study of the following description and from the appended drawing.

In the drawing accompanying this specification and forming a part of this application there is shown, for purpose of illustration, an embodiment which the invention may assume, and in this drawing:

FIGURE 1 is a perspective view of a preferred embodiment of the invention in use, FIGURE 2 is a fragmentary, exploded perspective view of the device seen in FIGURE 1, FIGURE 3 is an enlarged sectional view of a part of the structure seen in FIGURE 2 and generally corresponding to the line 3—3 of FIGURE 2, FIGURE 4 is a sectional view generally corresponding to the line 4—4 of FIGURE 3, and FIGURE 5 is a view similar to FIGURE 4 but showing an assembled position of parts.

With reference first to FIGURE 1, there is illustrated a device constructed in accordance with the present invention in use for protecting a fishing hook and/or a fishing lure (neither of which are shown). As herein disclosed, the instant device comprises a container 10 having one end closed by a centrally apertured, removable closure member 11. It is to be understood that as viewed in FIGURE 1, the hook or lure (not shown) is disposed within the container 10 and the line or leader 12, normally attached to the hook or lure, projects through the closure member central aperture. Thus, the hook or lure may be disposed within the container even though it remains attached to the fishing line. Although the container 10 may be made of glass or metal, it is preferable that it be made of a transparent plastic material for economy of manufacture, resistance to breakage in use, and for indicating what is contained therein without the necessity of removing the closure member.

Container 10, and referring to FIGURES 1 and 2, preferably takes the form of an elongated tube having an internal size large enough to receive the hook or lure and having a closed, rounded end 13 and an open end 14. Within the open container end 14, there is provided radially inwardly extending, structurally integral spiral thread means 15 for a purpose to appear.

Closure member 11 and as best seen in FIGURES 2 and 3, has a shank portion 16 of a transverse size for interference fit within the open container end 14 and an integral, radially enlarged head 17 whose periphery is shown serrated to provide a non-slip grip. The exterior of portion 16 of the closure member has spiral groove means 18 in its periphery for cooperation with the aforesaid thread means 15 and the end of the shank portion spaced from the head portion is tapered at 19 and terminates in a diameter smaller than the interior of the container open end to facilitate entry of the closure member shank portion into such open end.

It is an important feature of the present invention that the closure member 11 is resilient so that its shank portion 16 may be forced into the container open end 14 not withstanding the interference fit therebetween. Accordingly, the closure member is preferably formed of a suitable, resilient, resinous plastic material and is hollowed out at 20 (FIGURE 3) to decrease its cross-sectional area and thus increase its flexibility.

As previously mentioned, closure member 11 is provided with a central aperture indicated by reference character 21 in FIGURES 2, 3, 4 and 5. A slot 22 extends radially inwardly from the periphery of the closure member and terminates at the central opening 21. Normally, that is, with the closure member not assembled with the container (FIGURES 2 and 4), slot 22 is open to provide a gap through which the line or leader 12 may freely be passed for disposition within the aperture 21. When, however, the closure member shank portion is forced into the container open end, the closure member will be compressed (see FIGURE 5) thus closing the slot 22.

In use, the hook or lure with line or leader attached, will be disposed within the container 10 with the line extending through the container open end. The closure member 11 will then be assembled with the line by passing the latter transversely through the slot 22 for disposition in the member aperture 21. The closure member shank 16 will then be inserted into the container open end 14, the tapered portion 19 thereof facilitating such insertion, and rotated to threadably advance the closure member shank portion into the container until the member head portion 17 is seated against the open end of the container. As the closure member shank portion advances into the container, the closure member will be transversley compressed, as previously described, to close the slot 22 and to grip the line 12 in the member aperture 21 and thus insure against unintentional withdrawal of the hook or lure from the container.

When the hook or lure is to be removed from the container, closure member will be removed from the container open end by reversal of the rotative movement previously described. Upon removal of the closure member from the container open end, the closure member will spring back to its original position from that shown in FIGURE 5 to that shown in FIGURES 4 and 2, thus opening the slot 22 so that the line may freely be disassembled from the closure member. The hook or lure may now readily be removed from the container through its open end.

While the invention has been disclosed and claimed for use with a fishing hook or a fishing lure and an attached line, it is to be understood that the invention could also find use for enclosing bodies other than fishing hooks or lures. Also, if the parts are carefully proportioned and a line of the proper size is employed, a virtually air-tight assembly will be provided when the closure member is assembled with the container. This could prove to be advantageous if live bait is attached to the hook and if a quantity of water is to be enclosed in the container with such baited hook.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A device for enclosing and protecting a fishing hook and the like while it is attached to a line and the like, comprising a container for the hook having an opening through which the latter may be inserted and withdrawn, and a closure member for said container opening having a resilient portion for insertion axially thereinto, said closure member portion being of a size to be compressed a predetermined amount upon insertion thereof in said container opening and such portion having an axially extending slot extending inwardly of its periphery, said slot being sufficiently wide to provide for passage of the line therethrough when said closure member portion is uncompressed and being sufficiently narrow to restrict passage of the line therethrough when said closure member portion is compressed said predetermined amount.

2. The construction of claim 1 wherein said closure member portion has an interference fit with the defining margin of said container opening.

3. The construction of claim 2 wherein a part of said closure member portion is tapered to facilitate entry of said portion into said container opening.

4. The construction of claim 3 wherein said closure member part is located at that end of said closure member which first enters said container opening during assembly of said member with said container.

5. The construction of claim 2 wherein said slot extends radially inwardly of the periphery of said closure member portion and terminates adjacent the center thereof.

6. The construction of claim 2 and further comprising cooperating screw thread means in part carried by said container and in part carried by said closure member and providing for threaded interengagement of the latter with the former.

7. The construction of claim 6 and further comprising shoulder means for limiting insertion of said closure member into said container opening.

8. A device for enclosing and protecting a fishing hook and the like while it is attached to a line and the like, comprising a tubular container for the hook and open at one end to provide for insertion and withdrawal of the latter, and a resilient closure member for said container having a shank portion for insertion into said container open end and a shoulder portion on said shank for abutment with said container to limit insertion of said closure member shank thereinto, said closure member shank being proportioned for an interference fit with said container open end to provide for compression of said closure member a predetermined amount upon insertion of said closure member shank into said container open end and said closure member having a slot extending from end-to-end thereof and inwardly of its periphery, said slot being sufficiently wide to provide for passage of the line therethrough when said closure member is uncompressed and being sufficiently narrow to restrict passage of the line therethrough when said closure member is compressed said predetermined amount.

9. The construction of claim 8 wherein the end of said closure member shank portion spaced from said closure member shoulder portion is of a size to freely fit within said container open end to facilitate assembly of said closure member with said container.

10. The construction of claim 9 and further comprising cooperating screw thread means in part carried by said container open end and in part carried by said closure member shank and providing for threaded interengagement of the latter with the former.

11. The construction of claim 10 wherein said closure member has a central, axially extending opening therethrough for receiving the line, wherein said slot extends radially inwardly from said closure member periphery to said opening and wherein said slot is sufficiently narrow to be closed when said closure member is compressed said predetermined amount.

References Cited by the Examiner
UNITED STATES PATENTS

| | | |
|---|---|---|
| 678,101 | 7/1901 | Cowan. |
| 1,216,069 | 2/1917 | Cammack _____ 43—25.2 |
| 1,814,650 | 7/1931 | Waite. |
| 2,285,888 | 6/1942 | Benton _____ 43—25 |
| 2,379,013 | 2/1945 | Crowell _____ 43—54.5 |
| 2,849,825 | 9/1958 | Reisner _____ 43—57.5 X |

SAMUEL KOREN, *Primary Examiner.*

ABRAHAM G. STONE, *Examiner.*